US005460841A

United States Patent [19]
Herdeman

[11] Patent Number: 5,460,841
[45] Date of Patent: Oct. 24, 1995

[54] PROCESS FOR RIPENING BANANAS AND OTHER PRODUCE

[75] Inventor: Robert W. Herdeman, Loveland, Ohio

[73] Assignee: Chiquita Brands, Inc., Cincinnati, Ohio

[21] Appl. No.: 359,346

[22] Filed: Dec. 19, 1994

Related U.S. Application Data

[63] Continuation of Ser. No. 89,172, Jul. 8, 1993, abandoned.

[51] Int. Cl.$^6$ ..................................................... A23B 7/152
[52] U.S. Cl. ........................ 426/263; 426/270; 426/312; 426/316; 426/419
[58] Field of Search ................................... 426/263, 270, 426/312, 316, 419

[56] References Cited

U.S. PATENT DOCUMENTS

| | | | |
|---|---|---|---|
| 2,079,304 | 5/1937 | Polderman . | |
| 2,278,571 | 4/1942 | Skinner | 426/263 |
| 2,774,230 | 12/1956 | Kasser . | |
| 3,360,380 | 12/1967 | Bedrosian | 426/312 |
| 3,365,307 | 1/1968 | Dixon | 426/419 X |
| 3,450,542 | 6/1969 | Badran | 426/419 X |
| 3,487,769 | 1/1970 | Dixon . | |
| 3,620,765 | 11/1971 | McDonnell et al. | 426/263 |
| 3,924,010 | 12/1975 | Erb | 426/263 X |
| 3,958,028 | 5/1976 | Burg | 426/418 |
| 4,003,728 | 1/1977 | Rath | 62/78 |
| 4,454,723 | 6/1984 | Weasel, Jr. | 62/64 |
| 4,474,020 | 10/1984 | Freeman | 62/89 |
| 4,537,043 | 8/1985 | Volker et al. | 62/239 |
| 4,566,282 | 1/1986 | Knoblauch et al. | 62/48 |
| 4,716,739 | 1/1988 | Harris et al. | 62/78 |
| 4,764,389 | 8/1988 | LaBarge | 426/312 |
| 4,779,524 | 10/1988 | Wade | 99/476 |
| 4,817,391 | 4/1989 | Roe et al. | 62/17 |
| 4,824,685 | 4/1989 | Bianco | 426/418 |
| 4,833,892 | 5/1989 | Wassibauer et al. | 62/78 |
| 4,845,958 | 7/1989 | Senda et al. | 62/418 |
| 4,895,729 | 1/1990 | Powrie et al. | 426/419 X |
| 4,934,255 | 6/1990 | McDonnell et al. | 62/237 |
| 4,961,322 | 10/1990 | Oguma et al. | 62/179 |
| 4,987,745 | 1/1991 | Harris | 62/78 |
| 5,041,298 | 8/1991 | Wallace et al. | 426/418 |
| 5,054,291 | 10/1991 | Davis et al. | 62/62 |
| 5,063,753 | 11/1991 | Woodruff | 62/239 |
| 5,071,667 | 12/1991 | Grune et al. | 426/396 |
| 5,120,329 | 6/1992 | Sauer et al. | 55/16 |
| 5,152,966 | 10/1992 | Roe et al. | 422/111 |
| 5,172,558 | 12/1992 | Wassibauer et al. | 62/78 |

OTHER PUBLICATIONS

Brochure entitled *Palletized Ripening for Bananas*, Virginia Beach, Va., Nov., 1988.

*Primary Examiner*—Arthur L. Corbin
*Attorney, Agent, or Firm*—Frost & Jacobs

[57] ABSTRACT

A method for uniformly controlling the ripening of bananas and other perishable products from harvest to delivery, wherein a combination shipping and ripening container having an internal volume capable of receiving and maintaining a controlled atmosphere is provided. Freshly harvested, unripened perishable products are loaded into the container and cooled to a holding temperature in a range of from about 57° to about 70° F. Once the products are stabilized at the desired holding temperature, a controlled atmosphere including ethylene is preferably substantially immediately provided to the internal volume to uniformly initiate ripening of all of the loaded products. Once ripening has been initiated, the ethylene is reduced within the internal volume by displacement with a low oxygen controlled atmosphere, which is maintained within the container during storage, transportation, and delivery procedures. Prior to unloading the ripened products from the container, the atmosphere within the internal volume is returned to normal conditions. Once the loaded products have been stabilized at the desired holding temperature and exposed to the ethylene atmosphere to initiate ripening procedures, adjustments to the controlled atmosphere and temperature within the internal volume can be utilized to "tune" the ripening process as desired to provide ripened products for delivery within a range of timing schedules.

26 Claims, 1 Drawing Sheet

20

PROCESS FOR RIPENING BANANAS AND OTHER PRODUCE

This is a continuation of application Ser. No. 08/089,172, filed Jul. 8, 1993, now abandoned.

TECHNICAL FIELD

This invention relates to a process for shipping and ripening perishable products such as bananas and other fruits and vegetables, and, more particularly to a method for uniformly controlling the ripening of such products from harvest to delivery, wherein a single shipping and ripening container enables simultaneous shipping and ripening in a reliably, uniform, predictable, and controllable manner.

BACKGROUND ART

It is generally understood that agricultural crops such as fruits and vegetables are most preferably cooled as quickly as possible after harvest to inhibit premature ripening and to otherwise minimize post harvest spoilage. Various methods for cooling fruits and vegetables following harvest include the use of large room coolers wherein the perishable products are placed and their temperature drawn down to a desired level and relative humidity, vacuum cooling (generally for leafy vegetables and the like), subjecting the products to a shower of relatively cold water, and forced air cooling such as shown in U.S. Pat. No. 5,054,291, which issued to T. Davis et al. Generally, in these various methods for post harvest cooling, the products must be repackaged and/or otherwise removed from the cooling room or chamber for transportation and/or ripening procedures.

It has often been desirable to delay ripening of the perishable products until initial shipping had been completed, as most ripening facilities were not located in the tropics. In many cases, tropical fruit or the like was first cooled in a manner similar to that described above, then repackaged for shipment to remote markets in refrigerated shipping containers, and thereafter placed in ripening rooms for completion of the ripening process prior to final shipment to the retail market. U.S. Pat. No. 5,041,298 which issued to G. Wallace et al., illustrates a ripening room type apparatus which includes an atmosphere controlling means for applying controlled atmosphere to appropriately stacked crates of product therewithin. As discussed in this reference, economic considerations require such ripening rooms to be of relatively large size, and Wallace et al. direct their invention to the provision of a particular frame arrangement to allow selective stacking of the crates with particular interstitial volumes therebetween for facilitating air movement for ripening procedures.

U.S. Pat. No. 4,845,958, which issued to A. Senda et al. pertains to a refrigeration chamber which is designed to remove certain atmospheric constituents such as ethylene and nitrogen triethylamine, which have been found to cause increasingly rapid maturation, ripening and aging of perishable products. It is recognized in this reference that low temperature alone cannot prevent the further ripening of products, and means must be provided to remove or absorb elements which augment the ripening process. Senda et al. contemplate the use of adsorption materials located within a filtering mechanism for removing harmful aging substances as part of the air circulation within the chamber.

Conventionally, unripened fruit and vegetables have been shipped in refrigerated containers from shipping warehouses for freshly harvested products, and, following shipment, placed in a ripening facility for holding the products until proper maturation. In addition to the references discussed above, there is a significant amount of knowledge and prior art in the industry showing the use of controlled atmosphere arrangements for delaying ripening of product from harvest to the ripening facilities. For example, U.S. Pat. Nos. 5,152,966 and 4,817,391, which issued to E. Roe et al., describe devices for producing controlled atmosphere in an area in which perishable products are held prior to desired ripening procedures. Particularly, atmospheres of reduced oxygen and lowered temperature are discussed in these references, and membrane separation technology for reducing and separating unwanted constituents of the recycled atmosphere is illustrated. U.S. Pat. No. 4,824,685, which issued to M. Bianco, similarly describes the conventional ripening rooms wherein ethylene is dispersed at a preselected time to facilitate and speed up the ripening process. This particular reference also describes a preferred frame structure arranged within a ripening chamber to enable flow of the atmosphere through interstitial volume between rows of boxed products, and to allow more freedom in the placement and removal of palletized products into and out of the ripening chamber.

Similarly, U.S. Pat. No. 4,764,389, which issued to L. LaBarge, discusses a method of accelerating fruit ripening and respiration by providing a continuous in-flow of air and ethylene gas in a ripening chamber. In the industry, the continuous flow of gases within a ripening chamber, such as contemplated in the LaBarge patent, is utilized for a variety of products and processes for accelerating the ripening process just prior to release of perishable products into the retail trade. For example, palletized ripening for bananas and other perishable products has been provided at ripening facilities for use with semi-trailer loads of products which are backed into modular ripening units. Particularly, ripening equipment of this type can be obtained from Modular Ripening Company, Inc., (Virginia Beach, Va.), wherein a modular ripening facility includes a plurality of trailer docks, whereby semi-trailer loads of products are backed into the docks (with the truck doors open), and thereafter the ripening equipment provides a continuous flow of refrigerated atmosphere to the trailer to facilitate rapid ripening of the products therewithin.

Consequently, it can be seen that many procedures and structures have been developed in an attempt to provide the ability to ship unripened perishable products from the tropics and similar harvesting locations in refrigerated and controlled atmosphere containers, thereafter unloading the containers and shipping the product to ripening facilities, implementing rapid ripening processes, and then shipping the ripe products to retail market. Problems still remain, however, in the uniform and reliable control of ripening of the products such that all products in a particular load will be delivered with consistent color, maturity, and quality. Current procedures for shipping unripened products for bulk ripening prior to retail distribution cannot provide uniform and consistent quality (e.g., fruit temperature) and ripeness (e.g., color) characteristics, and slight changes and/or problems in the transportation or delivery schedules can result in relatively costly quality control problems.

Additionally, as can be appreciated, conventional shipping, unloading, ripening, and final transportation arrangements require substantial investments of labor and capital. All of these factors also add numerous variables to the product quality control concerns, further complicating and undermining the ability to maintain consistently high quality and uniform ripeness and color characteristics of the perishable products. It often takes 10–14 days from harvest for delivery of the product to the ripener, then an additional 4–7 days for ripening and delivery of product to retail merchants. Moreover, relatively slight delays in shipping and/or delivery schedules can result in major consequences with respect to fruit quality and spoilage.

SUMMARY OF THE INVENTION

It is an object of the present invention to obviate the above-described problems and shortcomings of transportation and ripening procedures heretofore available for perishable products such as bananas and the like.

It is another object of the present invention to provide an improved process for shipping and ripening fruits and vegetables from harvest to retail delivery, wherein a combination shipping and ripening container can be utilized from harvest to retail delivery for both transportation and ripening procedures.

It is also an object of the present invention to provide a method for uniformly controlling the ripening of bananas and other perishable products, wherein after stabilizing the freshly harvested products within the container at a cool holding temperature, the products are subjected to a controlled atmosphere including ethylene for a predetermined period of time to uniformly initiate the ripening process within the container.

It is yet another object of the present invention to provide a method for more uniformly controlling the ripening of bananas and other perishable products by immediately cooling the freshly harvested products to a holding temperature, and soon thereafter exposing the loaded and cooled products to ethylene for a predetermined time period in order to uniformly initiate the ripening process of all products held within the container, thereafter reducing the ethylene from the atmosphere within the container and maintaining the ripening products within a controlled atmosphere to precisely control the ripening process and speed of maturation.

It is yet another object of the present invention to provide an improved process for shipping and ripening bananas and other perishable products, wherein freshly harvested products are placed within a combination shipping and ripening container, cooled to a predetermined holding temperature, subjected to a predetermined exposure to a controlled atmosphere including ethylene to initiate uniform ripening of all products within the container, and thereafter subjected to a controlled low oxygen and low ethylene atmosphere to precisely control the product ripening and maturation process, and wherein adjustment of the controlled atmosphere and temperature within the combination container can be utilized to provide a uniformly ripened shipment of products at a relatively wider varying range of delivery dates.

In accordance with one aspect of the present invention, there is provided a method for uniformly controlling the ripening of bananas and other perishable products from harvest to delivery, including the steps of providing a combination shipping and ripening container having an internal volume capable of receiving and maintaining a controlled atmosphere. Freshly harvested, unripened perishable products are loaded into the container and cooled to a holding temperature in a range of from about 57° to about 70° F. Once the products are stabilized at the desired holding temperature, an atmosphere including ethylene is preferably substantially immediately provided to the internal volume to uniformly initiate ripening of all of the loaded products. Thereafter, the ethylene is substantially displaced from the internal volume by a low oxygen controlled atmosphere, which is maintained within the container during storage, transportation, and delivery procedures. Prior to unloading the ripened products from the container, the atmosphere within the internal volume is returned to normal conditions. Additionally, once the loaded products have been stabilized at the desired holding temperature and exposed to the ethylene atmosphere to initiate ripening procedures, adjustments to the controlled atmosphere and temperature within the internal volume can be utilized to "tune" the ripening process as desired to provide ripened products for delivery within a range of timing schedules.

BRIEF DESCRIPTION OF THE DRAWING

While the specification concludes with claims particularly pointing out and distinctly claiming the present invention, it is believed the same will be better understood from the following description taken in conjunction with the accompanying FIG. 1, which provides a schematic view of a preferred combination shipping and ripening container which can be utilized to implement the improved process of the present invention.

DETAILED DESCRIPTION OF THE INVENTION

Figure 1:
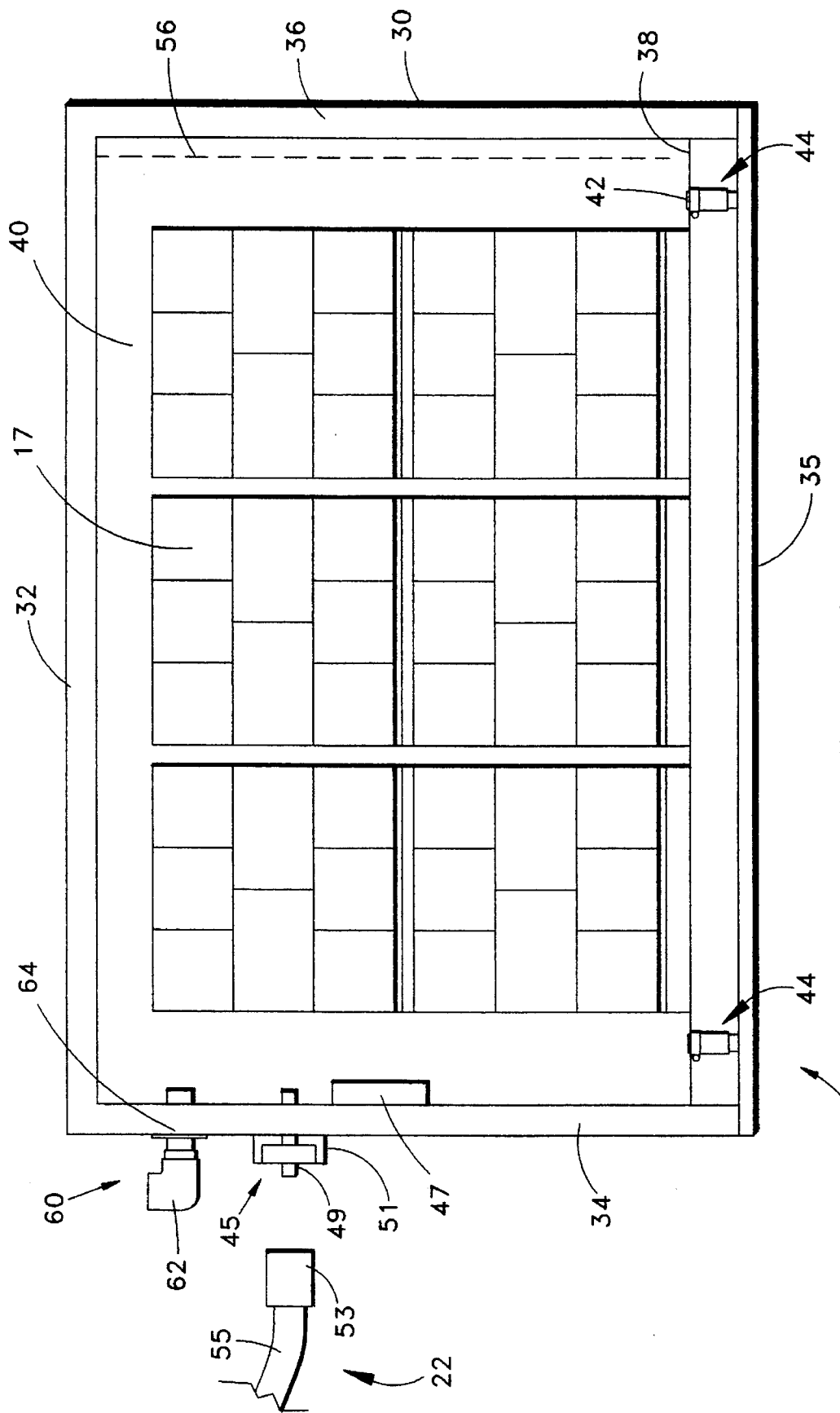

Referring now to FIG. 1 in detail, a modular individual combination shipping and ripening container (20) is illustrated for receiving and storing perishable products (e.g., product filled boxes 17) shown within a storage volume 40 therewithin. As mentioned above, the perishable products can be bananas or any other perishable fruit or vegetable. Container 20 comprises a housing 30 having a series of interconnected and spaced top (32), side (34) and bottom (35) walls, and reciprocable door arrangement or member 36.

A storage volume 40 is defined by the top and side walls 32 and 34, door member 36, and the interior floor member 38. As will be understood, it is preferred that storage volume 40 be provided as a substantially air-tight space. To prevent substantial leakage into storage volume 40, it is preferred that the connections between the adjacent walls of housing 30 and floor member 38 be carefully connected and sealed such as by welding, brazing, caulking, and/or with other gaskets and/or sealing arrangements. Cargo structures similar to the modular container 20 illustrated can be obtained from varying sources in the industry (such as from Nippon Freuhauf of Atsugi, Japan), and can be provided with additional leak-tight features as necessary.

Side or end wall 34 is also illustrated as being fitted with a quick connect/disconnect controlled atmosphere gas input port 45 which will detachably and selectively provide fluid connection between storage volume 40 and a source (e.g., 22) of the controlled atmosphere, which will most preferably be provided in the form of a gas. Input port 45 is illustrated as including a male connection 49 fitted through the bulkhead of side wall 34, preferably with a security cover/connection adapter 51 mounted adjacent the exterior portion of side wall 34. A flexible hose supply line 55 is illustrated as including a female quick connect coupler 53 at its distal end for detachable and selective connection with container 20. Obviously, the male/female order described could equally be reversed if desired. As will be understood, when container 20 is connected to a central source of controlled atmosphere gas (e.g., 22), input port 45 will be appropriately connected to a respective supply line (e.g., 55).

Container 20 is also illustrated as optionally including an internally mounted atmospheric monitoring means (47), which can also include a wiring harness or similar detachable connection which can be selectively attached to controlled atmosphere source (e.g., 22). Such monitoring means can include various sensors for monitoring particular constituents of the controlled atmosphere within container 20, such as oxygen, carbon dioxide, ethylene, and the like. In some applications of the present invention, the means for monitoring the atmospheric condition within storage volume 40 may also comprise temperature and pressure sensors, and/or a signalling device to indicate to a controller of the controlled atmosphere source, information such as the time of connection/disconnection of a particular container, current atmospheric conditions, and the like. Container 20 may include its own self-contained source of controlled atmosphere, or, more preferably, may be selectively attachable to a centralized source of controlled atmosphere (e.g., 22) by quick disconnect type arrangements (e.g., 45).

In a more sophisticated embodiment of the present invention, it may be preferred that the relative atmospheric conditions of the individual containers connected to the central station be determined for appropriate implementation of a hierarchal priority system by a controller or similar device associated with the source of controlled atmosphere. A preferred apparatus and method for implementing a hierarchal priority system for controlled atmosphere containers is shown and described in the commonly owned application Ser. No. 08/079,357 which issued on Aug. 2, 1994 as U.S. Pat. No. 5,333,394. Because it is only important that container 20 be provided with controlled atmosphere, and the means of providing such atmosphere is not believed to be critical to the present invention, further details of such structures will not be provided herein. As mentioned above, there are a number of prior references and products available in the industry which provide adequate detail of various means for providing controlled atmospheres to a storage volume.

As illustrated in FIG. 1, a preferred container 20 will also include an automatic relief valve 60 for providing venting between storage volume 40 and the ambient atmosphere. While not critical to this invention, a preferred automatic relief valve 60 might comprise an L-shaped conduit or pipe attached to the outer distal end of a threaded nipple or pipe 64 welded or otherwise attached through the bulkhead of side wall 34. An automatic pressure relief valve assembly can be located within the upper open end of pipe 62, so that upon reaching a predetermined maximum, atmosphere within internal volume 40 can be vented to ambient. As also shown in FIG. 1, a sealing curtain (56) may be installed after products are loaded into container 20 to augment the seal adjacent door 36 once loaded with products.

As also illustrated in the drawing, container 20 preferably includes one or more check valve drain assemblies (e.g., 44) located adjacent floor 38 to enable fluids such as condensation and the like to be drained from storage volume 40. Particularly, with respect to products such as fruits and vegetables, which often produce condensation as a result of continued respiration, it is important to provide a means for releasing collected fluid from within volume 40 to protect the product and to maintain optimal atmospheric conditions therewithin. Shipping containers commonly available in the industry generally include one or more drain holes, often having a downwardly extending drain pipe (e.g., 42) attached such as by welding or threading through the floor member 38. A preferred check valve might include a flexible tubular sleeve which can be attached to the lower portion of drain pipe 42 from below floor member 38, with such tubular sleeve receiving and housing a valve seat and ball valve arrangement for providing a reliable one-way check valve drain which can be connected and maintained from the exterior of container 20. Further details of a preferred check valve assembly are provided in the above-referenced application Ser. No. 08/079,357, now U.S. Pat. No. 5,333,394 the disclosure thereof being hereby incorporated herein by reference.

The method of the present invention contemplates that bananas or other perishable products will be loaded into boxes upon harvesting, and properly stacked on pallets for facilitating shipping procedures or break bulk packed into a designated portion of a ship hold or the like. As illustrated in FIG. 1, a plurality of boxes 17 are generally loaded on a pallet for easy movement by forklift or the like, and a plurality of pallets are stacked upon one another within container 20. It is contemplated that freshly harvested, unripened products will be loaded into the combination shipping and ripening container 20 or other break bulk container as soon as possible following harvest. Once the container is fully loaded with freshly harvested product, the internal volume 40 is cooled to a holding temperature in a preferred range of about 57° to about 70° F. For example, the most desirable holding temperature for bananas is generally about 58°–60° F. Internal volume 40 and the products held therewithin are stabilized at the desired holding temperature as quickly as possible following harvest to best preserve the freshness and quality of the products.

Once the products within the internal volume 40 are stabilized at the desired holding temperature, it is preferred that the products be substantially immediately exposed to ethylene gas (e.g., about 150 ppm ethylene mixture) in order to uniformly initiate the ripening of all of the loaded products in the container. It has been found that in transportation arrangements utilized heretofore for bananas and the like, products within a shipping container will naturally begin to ripen at varying rates, even where the internal temperature and atmosphere of the container is controlled prior to ripening procedures. For example, it is a fact that carbon dioxide is generally a denser gas than other constituents of air (e.g., oxygen), and that higher concentrations of $CO_2$ in the lower portions of a container can cause products in the upper regions of the container to ripen in a manner which causes the quality, color, and ripeness characteristics of the load of products to vary widely. Similarly, failure to provide for sufficient temperature control of products located remote from the air conditioning source can also allow non-uniform ripening. Since freshness and uniformity of color and temperature characteristics are critical to suppliers of perishable products, the shortcomings of the prior art in this respect are sometimes devastating to quality control concerns.

It should also be recognized that shipping containers for bananas and other perishable products generally are provided with refrigeration equipment to maintain the internal volume at a lowered temperature. It has been found that shipping containers used for bananas and other fruit products generally do not have the refrigeration capacity to handle the heat load resulting within the container from normal ripening of the products therewithin. Particularly, respiration of ripening fruit provides heat as a byproduct, and the temperature within internal volume 40 rises at an increasing rate as ripening proceeds. As a consequence, shippers of bananas and other perishable products often have been forced to ship less than full container loads of products in order to accommodate for the inevitable heat load increase therewithin, and to provide additional void space to aid in air circulation. Sufficient air circulation is quite important during ripening procedures, to ensure that proper levels of oxygen are maintained for aerobic ripening. The alternative to reduced capacity shipping was to ensure that ripening did not commence until transportation to the ripening facilities was completed. However, as discussed above, when ripening is delayed for what can be several weeks from harvest, quality characteristics, color, and maturity of any particular load of products is usually widely variable even under the best controlled atmospheric conditions of transportation.

According to the method of the present invention, after the freshly harvested products are loaded into the container and stabilized at the desired holding temperature, the products are exposed to an atmosphere including ethylene to uniformly initiate the ripening process of all products within the container. This ethylene initiation can be accomplished at the loading facility, or may be delayed for several days if the ethylene source is not available at the point of harvesting and loading the products. In such case, it is contemplated that a controlled low oxygen atmosphere (e.g., 3–5% oxygen, and 97–95% nitrogen) would be provided to internal volume 40 to suppress the ripening process until uniform exposure to the ethylene gas. It is preferred that the products be exposed to ethylene for 1–2 days to ensure uniform initiation of the ripening process for all products within the container.

Once the ripening process has been uniformly commenced, it is preferred that the level of ethylene gas be greatly reduced (total elimination is virtually impossible) within internal volume 40 and displaced with a low oxygen inert atmosphere to minimize the ripening process during shipping and transportation procedures. It has been found that by providing a controlled internal atmosphere at about 58° F. and approximately 5% oxygen (95% $N_2$), a fully loaded container can easily accommodate the resulting heat load of the uniformly ripening products therewithin without a need for augmentation or supplementation of the refrigeration equipment normally provided with shipping containers. As mentioned above, while each container might include its own source of controlled atmosphere gases, it is preferred that the containers be selectively attachable to a central source of controlled atmosphere so that capital expenses for the individual containers can be minimized. By uniformly initiating the ripening process for all products within the container soon after harvest, it has been found that the wide range of normal ripening of products within a loaded container is minimized, and color, maturity and freshness quality is maintained on a more consistent and reliable basis.

The fully loaded shipping and ripening container 20 can thereafter be transported via ship, train, airplane, or other mode of transportation to its retail distribution destination without a need for the usual stop off at the ripening facility. So long as the controlled atmosphere is appropriately maintained within the container during storage, transportation and delivery procedures, the ripening process can be controlled within internal volume 40 on a very reliable basis. In this way, delivery scheduling can be made more reliable, and additional tolerance for changing market needs and delivery problems can be accommodated. For example, if the products within a particular container are required sooner than originally planned, the temperature and/or atmosphere within the container can be modified to speed up the ripening process. For example, the temperature might be raised from 58° F. to 70°–75° F. and/or the oxygen level within the container might be raised to appropriately speed up the ripening process. Conversely, if delivery of the products were to be held off for a number of days for whatever reason, the products could be maintained within the low oxygen, cooled temperature controlled atmosphere for a longer period of time than originally planned.

As the delivery date for the products approaches, the controlled atmosphere within container 20 can be replaced with normal atmospheric conditions, and the product can be unloaded from the container as desired. As will be appreciated, the method of the present invention enables full container loads to be shipped directly from harvester to retailer without a need for repetitious unloading and loading from transportation containers to ripening facilities, to other transportation carriers, to retailers. It has been found that utilization of the process of the present invention does indeed result in reliably uniform and consistent ripeness, color, and freshness quality. Moreover, the capital costs, time requirements, labor requirements and unpredictability of ripening facilities can be obviated by the present invention, and suppliers of perishable products can be assured of more consistent and reliable quality with the added benefit of greater tolerance of changing delivery schedules and product demands.

It is believed that implementation of the present invention can also provide access to markets previously unaccessible by certain perishable products. Particularly, the lack of available infrastructure (e.g., ripening, storage, and transportation facilities) and/or capital investment for providing such infrastructure can be largely overcome by implementation of the present invention. Without a need for the expensive and cumbersome ripening facilities and the like, or expensive additional cooling capacity for shipping containers, it is believed that additional markets and geographic areas can be serviced in a cost effective and practical manner. Even where this infrastructure is available the present method can reduce the fruit age at retail market by the 4–7 day time period conventionally needed for ripening after shipping. The nearly one-third reduction in age also allows for better freshness and overall quality of the ripened products.

Having shown and described the preferred embodiments of the present invention, further adaptions of the present process for shipping and ripening fruits and other perishable products can be accomplished by appropriate modifications by those of ordinary skill in the art without departing from the scope of the present invention. Several of these modifications have been mentioned, and others will become apparent to those skilled in the art. As mentioned above, for example, the container of the present invention can be provided in the form of a portion of the hold of a ship or similar transportation vehicle for break bulk transportation. The products would be loaded directly from harvest into the cargo hold, cooled, then ripened in transit as described above for delivery at the destination port in uniformly ripe condition. Accordingly, the scope of the present invention should be considered in terms of the following claims, and is understood not to be limited to the details of structure, process, and operation shown and described in the specification and drawing.

I claim:

1. A method for uniformly controlling the ripening of bananas and other perishable products from harvest to delivery, said method comprising the steps of:

providing a combination shipping and ripening container having an internal volume capable of receiving and maintaining a controlled atmosphere of low oxygen content;

loading freshly harvested, unripened perishable products into said container;

cooling the loaded products to a holding temperature in a range of from about 57° to about 67° F.;

stabilizing the products at said holding temperature;

exposing said loaded products at said holding temperature to ethylene in order to uniformly initiate ripening of all of said loaded products in said container;

continuing ripening while displacing a portion of the existing atmosphere from said internal volume with a controlled atmosphere of a low oxygen content of approximately 5%, while sustaining a minimum ethylene level sufficient to support said continued ripening;

maintaining said low oxygen controlled atmosphere within said container during storage, transportation and delivery procedures;

returning the atmosphere within said container to normal atmospheric conditions; and unloading ripe products from said container as desired.

2. The method of claim 1, wherein said step of adding ethylene is undertaken substantially immediately following the step of stabilizing the products at a desired holding temperature.

3. The method of claim 1, wherein said step of adding ethylene is delayed until the loaded container has been shipped to at least an intermediate stop on the way to its destination.

4. The method of claim 1, further comprising the step of shipping the products in said shipping and ripening container.

5. The method of claim 1, wherein said low oxygen content controlled atmosphere is supplied from a central source which can be selectively connected to said container.

6. The method of claim 1, wherein said container comprises a refrigeration unit for cooling the internal volume during shipping, storage, and ripening procedures.

7. The method of claim 1, further comprising the step of modifying the temperature within said internal volume in order to selectively control the rate of ripening of said products held therewithin.

8. The method of claim 1, wherein said shipping and ripening container is opened only during said step of loading freshly harvested, unripened perishable products, and during said step of unloading ripe products.

9. The method of claim 1, wherein during the step of stabilizing the products at said holding temperature, the sub-step of reducing the oxygen content of said internal volume is performed.

10. The method of claim 1, wherein during the step of maintaining said low oxygen controlled atmosphere, the sub-step of increasing the oxygen content of said internal volume is performed to increase the rate of ripening of said perishable products.

11. A method for uniformly controlling the ripening of bananas and other perishable products from harvest to delivery, said method comprising the steps of:

providing a combination shipping and ripening container having an internal volume capable of receiving and maintaining a controlled atmosphere of low oxygen content;

loading freshly harvested, unripened perishable products into said internal volume of a container;

immediately cooling the loaded products to a holding temperature of from about 58° to about 60° F.;

sealing the loaded container;

stabilizing the products at said holding temperature;

exposing said loaded products at said holding temperature to ethylene in order to uniformly initiate ripening of all of said loaded products in said container;

continuing ripening while displacing a portion of the existing atmosphere therewithin with a controlled atmosphere of a low oxygen content of approximately 5%, while sustaining a minimum ethylene level sufficient to support said continued ripening;

maintaining said low oxygen controlled atmosphere within said container during storage, transportation and delivery procedures;

returning the atmosphere within said container to normal atmospheric conditions; and unloading ripe products from said container as desired.

12. The method of claim 11, wherein ethylene is provided to said internal volume substantially immediately following the stabilization of said loaded products at a desired holding temperature.

13. The method of claim 11, wherein said step of exposing the products to ethylene is delayed until the loaded container has been shipped to at least an intermediate stop on the way to its destination.

14. The method of claim 11, further comprising the step of shipping the products in said shipping and ripening container.

15. The method of claim 11, wherein said low oxygen content controlled atmosphere is supplied from a central source which can be selectively connected to said container.

16. The method of claim 15, wherein said container is selectively connected to a central source of said controlled atmosphere at different times during its shipping and storage procedures.

17. The method of claim 11, wherein said step of loading said products includes substantially filling said internal volume with boxes of products to be shipped and ripened.

18. The method of claim 11, further comprising the step of modifying the temperature within said internal volume in order to selectively control the rate of ripening of said products held therewithin.

19. The method of claim 11, wherein during the step of stabilizing the products at said holding temperature, the sub-step of reducing the oxygen content of said internal volume is performed.

20. The method of claim 11, wherein during the step of maintaining said low oxygen controlled atmosphere, the sub-step of increasing the oxygen content of said internal volume is performed to increase the rate of ripening of said perishable products.

21. A method for uniformly controlling the ripening of bananas and other perishable products from harvest to delivery in a shipping container, wherein said loaded products need be handled only during initial loading of fresh harvested products, and unloading of ripe products, said method comprising the steps of:

providing a combination shipping and ripening container having an internal volume capable of receiving and maintaining a controlled atmosphere of low oxygen content;

loading freshly harvested, unripened perishable products into said internal volume of a container;

immediately cooling the loaded products to a holding temperature of from about 58° to about 60° F.;

sealing the loaded container;

stabilizing the products at said holding temperature;

exposing said loaded products at said holding temperature to ethylene in order to uniformly initiate ripening of all of said loaded products in said container;

continuing ripening while displacing a portion of the existing atmosphere therewithin with a controlled atmosphere of a low oxygen content of approximately 5%, while sustaining a minimum ethylene level sufficient to support said continued ripening;

maintaining said low oxygen controlled atmosphere within said container during storage, transportation and delivery procedures;

returning the atmosphere within said container to normal atmospheric conditions; and unloading ripe products from said container as desired.

22. The method of claim 21, further comprising the step of providing an inert controlled atmosphere within said internal volume prior to exposing said loaded products to ethylene.

23. The method of claim 21, wherein the step of exposing said loaded products to ethylene is undertaken substantially immediately following stabilization of the products at said holding temperature.

24. The method of claim 21, wherein said step of exposing said loaded products to ethylene extends for approximately 48 hours or less.

25. The method of claim 21, wherein during the step of stabilizing the products at said holding temperature, the sub-step of reducing the oxygen content of said internal volume is performed.

26. The method of claim 21, wherein during the step of maintaining said low oxygen controlled atmosphere, the sub-step of increasing the oxygen content of said internal volume is performed to increase the rate of ripening of said perishable products.

* * * * *